(12) United States Patent
Caponi et al.

(10) Patent No.: US 7,349,077 B2
(45) Date of Patent: Mar. 25, 2008

(54) METHOD AND APPARATUS FOR MEASURING THE POLARIZATION MODE DISPERSION OF AN OPTICAL FIBER

(75) Inventors: Renato Caponi, Turin (IT); Marcello Potenza, Turin (IT); Diego Roccato, Turin (IT); Marco Schiano, Turin (IT)

(73) Assignee: Telecom Italia S.p.A., Milan (IT)

( * ) Notice: Subject to any disclaimer, the term of this patent is extended or adjusted under 35 U.S.C. 154(b) by 217 days.

(21) Appl. No.: 10/520,687

(22) PCT Filed: Jul. 2, 2003

(86) PCT No.: PCT/EP03/07048

§ 371 (c)(1),
(2), (4) Date: Jan. 5, 2005

(87) PCT Pub. No.: WO2004/005877

PCT Pub. Date: Jan. 15, 2004

(65) Prior Publication Data
US 2006/0023224 A1    Feb. 2, 2006

(30) Foreign Application Priority Data
Jul. 5, 2002    (IT)    ............ TO2002A0585

(51) Int. Cl.
*G01N 21/00*    (2006.01)
(52) U.S. Cl. .................... 356/73.1; 356/491
(58) Field of Classification Search ................ 356/477, 356/491, 492, 73.1
See application file for complete search history.

(56) References Cited

U.S. PATENT DOCUMENTS

| | | | | |
|---|---|---|---|---|
| 5,341,205 | A * | 8/1994 | McLandrich et al. ...... | 356/73.1 |
| 5,712,704 | A * | 1/1998 | Martin et al. ................ | 356/491 |
| 5,852,496 | A * | 12/1998 | Gisin et al. .................. | 356/477 |
| 6,204,924 | B1 * | 3/2001 | Cyr ............................. | 356/453 |

(Continued)

FOREIGN PATENT DOCUMENTS

WO    96/36859    11/1996

OTHER PUBLICATIONS

"Polarization Mode Dispersion of Short and Long Single-Mode Fibers", Nicolas Gisin et al; Journal of Lightwave Technology vol. 9, No. 7, Jul. 1991; Search report; Form PCT/IB/308 (Apr. 2002).

*Primary Examiner*—Gregory J. Toatley, Jr.
*Assistant Examiner*—Scott M Richey
(74) *Attorney, Agent, or Firm*—Andrew Wilford

(57) ABSTRACT

The present invention relates to a new model for interpreting interferometric measurements, able to lead to a new method, system (10) and device (27) for measuring the PMD (Polarisation Mode Dispersion) of an optical fibre (11). The model, which is based on the theory of propagation of the optical signal as can be determined according to the socalled Prindpal States of Polarisation (PSPs) of the fibre, leads to a new interpretation of the interferogram generated with the interferometric measurements and is characterized in that it identifies in said interferogram a central peak and two side lobes. Thanks to this new model, it is possible to determine the PMD of the fibre based on the information content associated to at least one of the two side lobes identified in the interferogram.

10 Claims, 2 Drawing Sheets

U.S. PATENT DOCUMENTS 6,271,922 B1    8/2001   Bulow
6,924,890 B1*   8/2005   Vobian et al. ................ 356/73

2006/0164652 A1*   7/2006   Cyr ............................ 356/477

* cited by examiner

US 7,349,077 B2

METHOD AND APPARATUS FOR MEASURING THE POLARIZATION MODE DISPERSION OF AN OPTICAL FIBER

CROSS REFERENCE TO RELATED APPLICATIONS

This application is the US national phase of PCT application PCT/EP2003/007048, filed 2 Jul. 2003, published 15 Jan. 2004 as WO 2004/005877, and claiming the priority of Italian patent application TO2002A000585 itself filed 5 Jul. 2002.

TECHNICAL FIELD

The present invention relates to a method for measuring the Polarisation Mode Dispersion or PMD of an optical fibre, to the system able to allow its application and to the device able to perform the PMD measurements according to said method.

BACKGROUND ART

As is well known, polarisation mode dispersion is a phenomenon of distortion of the optical signal that propagates in single mode optical fibres, i.e. optical fibres that carry signals in a fundamental propagation mode constituted by a pair of degenerate modes with orthogonal polarisation.

This phenomenon is, as is well known, linked to the dual degeneration of the fundamental mode of the optical fibres. Construction imperfections in real fibres (core ellipticity, external stresses, etc.) entail different group velocities for the two degenerate modes of the optical signal transmitted at one end of the fibre and hence distortions of the signal received by a receiving device (receiver) located at a second end of the fibre.

Therefore, it is important to develop accurate techniques for measuring PMD to characterize, for example, telecommunication systems that use optical fibres to carry signals, in particular in the case of high speed or high capacity transmission systems, for instance at bit rates up to 10 Gbit/sec or higher.

The PMD of the fibres is measured, for instance, by connecting a segment of optical fibre (fibre) 11 to be characterized to appropriate measuring instruments or devices 10 (FIG. 1).

The paper "Polarization Mode Dispersion of Short and Long Single-Mode Fibers" by N. Gisin et al, published on the "Journal of Lightwave Tech." Vol.9 on Jul. 7, 1991 discloses, for instance, an instrument 10 for measuring the PMD, which comprises an optical source 21 (FIG. 1, FIG. 2), able to generate optical signals to be applied to the fibre 11, a Michelson interferometer (interferometer) 25 connected to the second end of the fibre 11, able to apply Differential Group Delays or DGD to the received optical signal and, at the output of the interferometer 25, a measuring device 27 able to convert the optical signals into electrical signals and to process, on the basis of program modules stored therein, the electrical signals received.

According to the prior art, the electrical signals obtained downstream of the interferometer 25 are graphically represented by the measuring device 27 by means of an interferogram having in its x-axis time offset values introduced by the interferometer and in its y-axis values of intensity of the photo-current generated.

In particular, according to the mentioned paper, said interferogram is to be interpreted as a Gaussian distribution of PMD of the fibre, so that the PMD itself can be determined according to the standard deviation of the Gaussian curve that best interpolates the interferogram.

This type of interpretation of the electrical signals derives from the fact that to the fibre 11 is applied a propagation model called "waveplate model", which consists of considering the real optical fibre as a great number of birefringent plates positioned in cascade with respect to each other and having their main axes oriented randomly.

This model is used, as is well known, to assess signal time-of-flight, in the hypothesis that at each interface between a waveplate and the next one the optical signal is coupled randomly on the main axis of the downstream waveplate.

Based on the known model and in the realistic hypothesis that the length of the fibre is far greater than the coupling length between the polarizations, the prior art concludes that the measured graphic representation corresponds to a Gaussian curve with a standard deviation equal to twice the standard deviation of the optical signal due to PMD and hence indicative of the PMD of the fibre.

However, it is believed that the measurements obtained taking the known model as a reference do not precisely correspond to real PMD values.

In essence, it is believed that the conclusions of the prior art, which are based on the identification of the distribution of the times-of-flight of the optical signal with the distribution of the electrical field are wrong.

It is also believed that the PMD measurements obtained according to the known model are consequently only approximately correct.

DISCLOSURE OF THE INVENTION

The technical problem the present invention aims to tackle is to determine a new propagation model of the fibre that will lead, in the first place, to a new method for measuring the fibre PMD that is more realistic under all computational conditions.

The present invention therefore aims to solve the above technical problem by means of a new model for interpreting the interferogram and consequently a new method, system and device for determining the PMD of the fibre, as claimed.

In particular, the new model which is based on the theory of propagation of the optical signal as can be determined according to the so-called Principal States of Polarisation (PSPS) of the fibre, leads to a new interpretation of the interferogram, characterized by the identification in said interferogram of a central peak and two side lobes.

Thanks to this new model, it is possible to determine the PMD of the fibre on the basis of the information content associated with at least one of the side lobes identified in the interferogram.

BRIEF DESCRIPTION OF THE DRAWINGS

This and other characteristics of the present invention shall become readily apparent from the following description of a preferred embodiment, provided purely by way of non limiting example with the aid of the accompanying drawings, in which.

DESCRIPTION OF A PREFERRED EMBODIMENT

Figure 1:
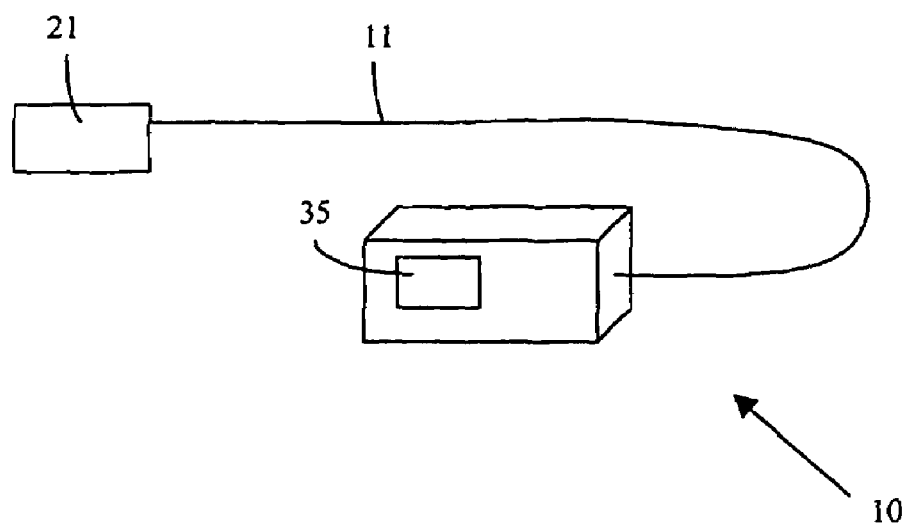
FIG. 1 shows a general measurement layout that uses the interferometric method (IM)
Figure 2:
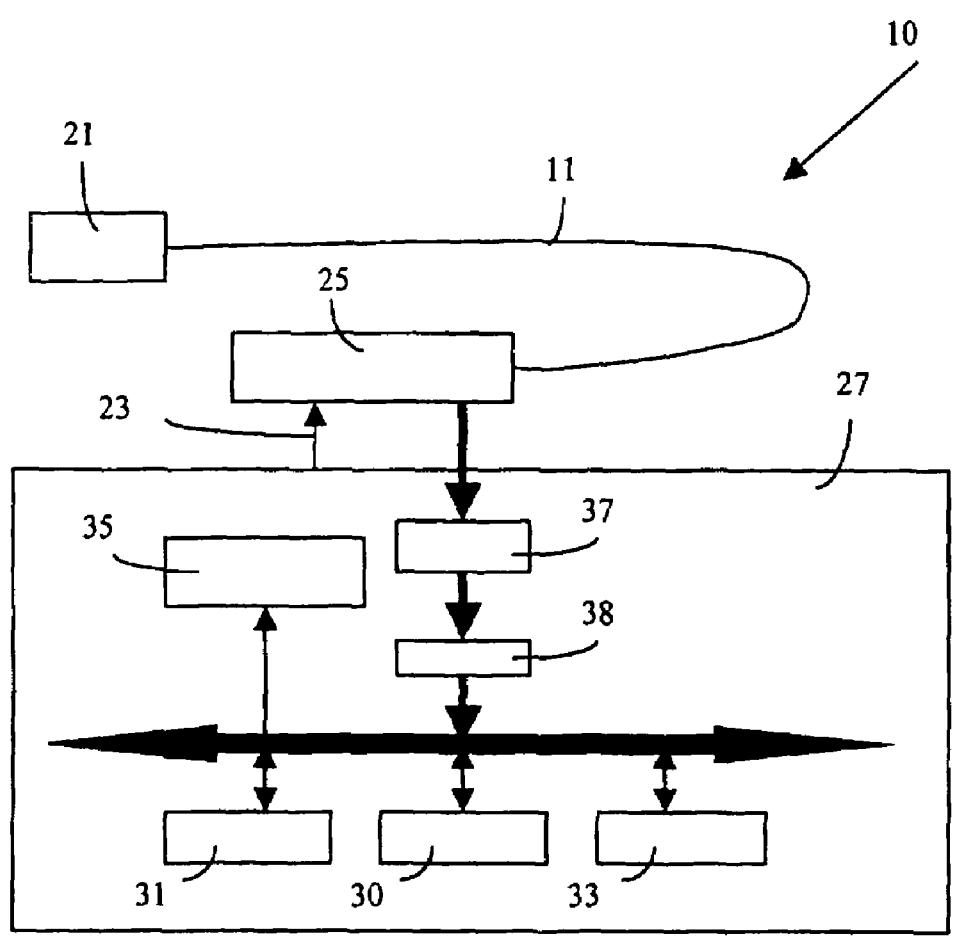
FIG. 2 shows a block diagram of the system of FIG. 1.

With reference to FIG. 2, the instrument or system for measuring the PMD able to use the interferometric method (measuring system or apparatus IM) 10 comprises, in particular, an interferometer 25 and a measuring device 27 connected at the output of the interferometer 25 itself and able to control its operation, in known fashion, by means of a control connection 23.

The measuring device 27 comprises, for instance, a control unit (CPU) 30, a read-only memory unit (ROM) 31 and a random access memory unit (RAM) 33, all known and connected to each other in known fashion by means of a data, control and command channel (BUS).

The measuring device 27 further comprises a display device (display) 35, known in itself, and an opto-electronic module 37 associated to an amplifier 38, respectively able to convert the optical signals coming from the interferometer 25 into electrical signals and to amplify them; the display 35 and the amplifier 38 are connected, in known fashion, to the BUS.

The ROM 31, according to the present invention, comprises program modules developed when designing the measuring system 10 and able to implement the method according to the invention, as will be described in detail further on.

Said program module, as will be readily apparent to a person versed in the art, can also be stored in the RAM 33 by means of reading devices, not shown in the figure, able both to read from appropriate computer products the program modules according to the invention and to store said program modules in the RAM 33 itself.

With reference to the measuring system 10, the method according to the present invention is based on the hypothesis of broad band radiation with spectral components that propagate according to the theory of the Principal States of Polarisation (PSPs).

In particular, with reference to the measuring system 10, the method according to the invention is based on the following interpretative model and the corresponding logical-mathematical passages:

(a) the spectrum of the (incoherent) optical source is approximated in segments by a family of rectangular spectral intervals with extension $\Delta v$ (FIG. 3), each described by its amplitude, by its random polarisation state and by a phase factor, which is also stochastic;

(b) the spectral width of the interval is specified relative to the band of the PSPs and to the bandwidth of the amplifier 38, in order to obtain a reasonably accurate approximation of the spectrum of the optical source 21;

(c) a statistical description of optical propagation inside the fibre being measured is used, in terms of ensemble of spectral intervals defined above, ensemble that excites a statistical set of PSP, (d) the output spectrum of the signal is thereby obtained, which comes to depend on a set of statistical parameters: amplitudes of projection on the PSP and on the axes of the polarisation analyser, values of DGD and phase factors;

(e) the interferometric photo-current is expressed according to the power spectrum of the optical source 21 and of the density of probability of the DGD determined by the PMD of the fibre 11.

The result obtained at passage (e) represents one of the characteristic elements of the present invention and is applied to implement the method according to the present invention.

Figure 3:
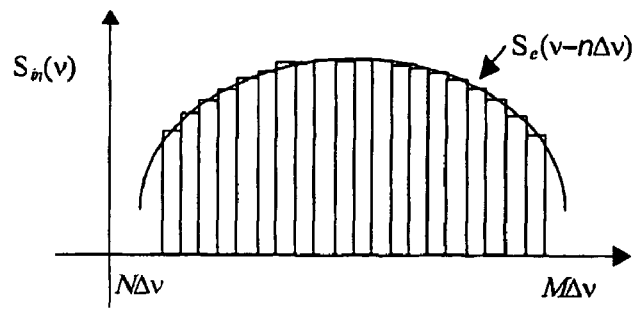
FIG. 3 shows a general diagram of the model of the optical source constituting the basis of the method according to the invention.

In particular, based on the proposed model, illustrated in FIG. 3, the spectrum $S_i.(v)$ of a randomly polarized source is subdivided M-N rectangular spectral intervals $S_e(v)$ having width $\Delta v$ and amplitude $U_n$ according to the following mathematical expression:

$$S_{in}(v) = \sum_{n=N}^{M} U_n p_n S_e(v - n\Delta v) e^{j\phi_n} \quad (1)$$

Each replication translated in frequency of the fundamental interval has a polarisation state and a phase factor represented by statistical vectors $p_n$ and by independent stochastic variables $\phi_n$.

The choice of spectral width $\Delta v$ is constrained by two extremes of a physical nature. The upper limit for $\Delta v$ is the minimum band of the PSPs in the spectral domain of the optical source 21 (FIG. 2, FIG. 3), since the assumption is that every spectral interval propagates according to the model of the PSPs at the first order. This upper limit is, as is well known, in the order of the inverse of the average DGD for the fibre being measured and it falls within the GHz range even for values of DGD of tens of picoseconds. On the other hand, the lower limit for $\Delta v$ is imposed by the opto-electronic module 37 and by the amplifier 38 which, as is well known, has a limited band, as set out in detail hereafter and it can fall in the range of hundreds of kHz.

A value of $\Delta v$ selected within the frequency domain identified by said upper and lower limit is to be considered suitable for an approximation in rectangular segments and sufficiently accurate for all LED optical sources commonly used in IM apparatuses (10); moreover, this conclusion confirms that the approximation proposed in the mathematical expression (1) has correct physical foundations.

The set of spectral intervals $\{U_n S_e(v-n\Delta v)\}$, after being launched in the fibre 11, excites a set of PSP pairs, each characterized by the value $\Delta \tau_n$ of DGD. At the input end of the fibre, the elementary spectral intervals are projected on the slow and fast PSP, respectively with amplitudes $\sqrt{\alpha_n}$ and $\sqrt{1-\alpha_n}$; in which $\alpha_n$ represents the power coupling coefficient between the $n^{th}$ interval and the axis associated with the corresponding fast PSP.

In similar fashion, at the output of the fibre 11, the coefficients of projection of the output PSPs on the axis of polarisation of the interferometer are indicated as $\sqrt{\beta_n}$ and $\sqrt{1-\beta_n}$. The spectrum of the signal after the latter selection in polarisation is then expressed in the form:

$$S_{out}(v) = \sum_{n=N}^{M} a_n U_n S_e(v - n\Delta v) e^{-j2\pi v \Delta \tau_n/2} e^{j\phi_n} + \sum_{n=N}^{M} b_n U_n S_e(v - n\Delta v) e^{j2\pi v \Delta \tau_n/2} e^{j\phi_n} \quad (2)$$

in which, for the sake of convenience, the two new statistical variables $a_n = \sqrt{\alpha_n \beta_n}$ and $b_n = \sqrt{(1-\alpha_n)(1-\beta_n)}$ have been introduced.

The average value of the DGD of the PSP was neglected, referring the quantities $\Delta\tau_n$ to the origin of the delays set at the interferometer.

Since in the time domain, as is well known, the interferometric photo-current I is proportional to the auto-correlation function of the output signal, in the frequency domain the quantity to be computed is the power spectrum $|S_{out}(v)|^2$:

$$I(v) \propto S_{out}(v) \cdot S_{out}^*(v) = \qquad (3)$$

$$= \left( \sum_{n=N}^{M} a_n U_n S_e(v - n\Delta v) e^{-j2\pi v \Delta r_n/2} e^{j\phi_n} + \sum_{n=N}^{M} b_n U_n S_e(v - n\Delta v) e^{j2\pi v \Delta r_n/2} e^{j\phi_n} \right) \cdot (c.c.)$$

relationship in which 'c.c' indicates the complex conjugated expression of the term in round parentheses.

According to the present invention, it is hereby demonstrated that the interference between different spectral intervals $S_e(v-n\Delta v)e^{j\Phi_n}$ does not give rise to any significant contribution to the photo-current and therefore can be neglected.

For this purposes, the expression of the photo-current generated by the opto-electronic module (detector) 37 and by the amplifier 38 shall now be discussed in detail, with particular reference to the band limitation of the detector 37 and of the amplifier 38.

The module of the field incident on the opto-electronic module 37 has, as is well known, the following expression:

$$E_p(t, T) = \frac{1}{2}[E_{IN}(t) + E_{IN}(t + T)],$$

in which $$T = 2\frac{n}{c}(L_1 - L_2)$$

is the delay introduced by the offset of the interferometer, $E_p$(t, T) is the electrical field incident on the opto-electronic module 37 and $E_{IN}$(t) is the electric field of the signal at the output of the fibre.

It should be noted that all signals depend on two variables: the variable t is the time variable whereon the signals are measured, with a domain coinciding with the time interval of the measurement (typically a few seconds). The variable T is, as stated, the delay introduced by the offsetting of the interferometer 25, with a domain that coincides with the DGD interval of interest, typically [0.1, 100] ps. The quadratic photo detection and electrical amplification process is characterized, neglecting the conversion constants of the physical magnitudes, by the following relationships between the signals:

$$I_R(t, T) = E_p^2(t, T) =$$

$$\frac{1}{4}[E_{IN}(t) + E_{IN}(t + T)]^2 = \frac{1}{4}[E_{IN}^2(t) + E_{IN}^2(t + T) + 2E_{IN}(t)E_{IN}(t + T)]$$

$$I(t, T) = I_R(t, T) * h(t) = \frac{1}{4}[E_{IN}^2(t) + E_{IN}^2(t + T) + 2E_{IN}(t)E_{IN}(t + T)] * h(t)$$

in which $I_R$(t, T) is the current generated by the optoelectronic module 37 and sent to the amplifier 38, I(t, T) is the current at the output of the amplifier 38 and h(t) is the impulse response of the amplifier 38 with limited band, which naturally depends only on the variable t.

Recalling that the signals $E_{IN}$(t) and $E_{IN}$(t+T) are at optical frequencies and that no electrical amplifier is capable of following their variations, one obtains:

$$I(t,T)=I_R*h(t) \propto <E_{IN}^2(t)>_{1/B}+<E_{IN}^2(t+T)>_{1/B}+2E_{IN}(t)E_{IN}(t+T)*h(t)$$

in which the symbol $<\ >_{1/B}$ indicates the time average computed over an interval in the order of the reciprocal of the band of the amplifier 38.

Since the continuous component does not carry the information and is suppressed by the measuring instruments of the PMD, it is best to consider only the alternate component of the previous signal:

$$I_{AC}(t,T) \propto E_{IN}(t)E_{IN}(t+T)*h'(t)$$

in which the spectrum of h'(t) coincides with that of h(t), except in the origin where it is zeroed.

In the frequency domain, computing the Fourier transforms with respect to the variable t, one obtains:

$$\tilde{I}_{AC}(f,T) \propto [\tilde{E}_{IN}(f)*\tilde{E}_{IN}(f)e^{j2\pi fT}]\cdot \tilde{H}'(f) \qquad (4)$$

It is readily apparent that the spectral components of the convolution in parentheses that exceed the band of the amplifier 38, are cut by the amplifier 38 itself.

It is clear that, since the signal $E_{IN}$(f) has very broad band, typically some THz, to proceed with the analysis it is necessary to subdivide the spectrum into sectors:

$$\tilde{E}_{IN}(f) = \sum_{n=-M}^{M} S_e(f - n\Delta f)e^{j\phi_n}.$$

Replacing this expression in (4), one obtains:

$$\tilde{I}_{AC}(f, T) \propto \left[ \sum_{n=-M}^{M} S_e(f - n\Delta f)e^{j\phi_n} * \sum_{n=-M}^{M} S_e(f - n\Delta f)e^{j\phi_n}e^{j2\pi fT} \right] \cdot \tilde{H}'(f) \qquad (5)$$

According to the present invention, it is now possible to demonstrate that, under typical conditions of measurement and with commonly used amplifiers, thanks to the ratio between the band B of the amplifier and the extension $\Delta f$ of the spectral sectors, the expression (5) can be reduced to the diagonal form.

Considering, then, the convolution of two adjacent rectangular spectral sectors $r_1(f)$ and $r_2(f)$ of amplitude A and band $\Delta f$:

$$r_1(f)*r_2(f)=A^2 f, 0 \leq f \leq \Delta f$$

Hereinafter the convolution of an elementary spectral sector with itself will also be considered:

$$r_1(f)*r_1(f)=-A^2+A^2\Delta f, 0 \leq f \leq \Delta f$$

To evaluate the influence of the convolution of adjacent sectors on the photo-current, one can compute the ratio between the energies of the two preceding convolutions in the band of the amplifier 38:

$$SNR = \frac{E_{11}}{E_{12}} = \frac{\int_0^B [r_1(f) * r_1(f)]^2 \, df}{\int_0^B [r_1(f) * r_2(f)]^2 \, df} =$$

$$\frac{\int_0^B [-A^2 f + A^2 \Delta f]^2 \, df}{\int_0^B [A^2 f]^2 \, df} = \frac{\int_0^B [A^4 f^2 - 2A^4 f \Delta f + A^4 \Delta f^2] \, df}{\int_0^B [A^4 f^2] \, df},$$

$$SNR = \frac{E_{11}}{E_{12}} = \frac{\left[\frac{A^4}{3} f^3 + A^4 f \Delta f^2 - A^4 f^2 \Delta f\right]_0^B}{\left[\frac{A^4}{3} f^3\right]_0^B} =$$

$$\frac{\frac{A^4 B}{3}(B^2 + 3\Delta f^2 - 3\Delta fB)}{\frac{A^4 B^3}{3}} = \frac{(B^2 + 3\Delta f^2 - 3\Delta fB)}{B^2}.$$

Given that k=Δt/B, one easily computes:

$SNR = 3k^2 - 3k + 1.$

This value is further divided by two, taking into account that each sector has two adjacent sectors. The following Table 1 shows the value of SNR/2 thus computed as a function of the Δf/B ratio.

TABLE 1

| Δf/B | SNR/2 (lin.) | SNR/2 (dB) |
|---|---|---|
| 2 | 3.5 | 5.45 |
| 3 | 9.5 | 9.79 |
| 4 | 18.5 | 12.68 |
| 5 | 30.5 | 14.78 |
| 6 | 45.5 | 16.59 |
| 10 | 135.5 | 21.32 |

It is readily apparent that for k=3 the value of SNR/2 already approaches 10 dB and exceeds 22 dB for k=10.

One can therefore conclude that, having appropriately chosen the ratio k=Δf/B, the prevalent contribution to the convolution in (2) is given by the sum of the convolutions of the homologous terms, and hence the current photo-detected by the opto-electronic module 37 can be computed as:

$$\bar{I}_{AC}(f,T) \propto \left[\sum_{n=-M}^{M} S_e(f - n\Delta f) e^{j\phi_n} * S_e(f - n\Delta f) e^{j\phi_n} e^{j2\pi fT}\right] \cdot \tilde{H}'(f) \quad (6)$$

Using the result just obtained, only the diagonal terms of the equation (3) survive and the photo-current I(v) takes on the following form:

$$I(v) \propto \sum_{n=N}^{M} (a_n^2 + b_n^2) U_n^2 |S_e(v - n\Delta v)|^2 + \quad (7)$$

$$\sum_{n=N}^{M} (a_n b_n) U_n^2 |S_e(v - n\Delta v)|^2 (e^{-j2\pi v \Delta \tau_n} + e^{j2\pi v \Delta \tau_n})$$

The equation (7) is, according to the present invention, the most general expression of the photo-current in the frequency domain that can be obtained without making hypotheses on the statistical nature of the PMD of the fibre being measured. Hereafter, the two cases of fibre with deterministic PMD and with random PMD shall be examined separately.

An optical fibre with a deterministic birefringence (for example, a polarisation-maintaining fibre) is characterized by constant DGD and PSP as a function of frequency. Consequently: $\Delta\tau_n = \Delta\tau$, $a_n = a$, $b_n = b$ are constant and the equation (7) is simplified in:

$$I(v) \propto (a^2 + b^2) \sum_{n=N}^{M} U_n^2 |S_e(v - n\Delta v)|^2 +$$

$$ab(e^{-j2\pi v \Delta \tau} + e^{j2\pi v \Delta \tau}) \sum_{n=N}^{M} U_n^2 |S_e(v - n\Delta v)|^2,$$

i.e., $$I(v) \propto (a^2 + b^2) |S_{in}(v)|^2 + ab(e^{-j2\pi v \Delta \tau} + e^{j2\pi v \Delta \tau}) |S_{in}(v)|^2.$$

A Fourier anti-transform directly yields the expression of the photo-current in the time domain:

$$I(T) \propto (a^2 + b^2) s_c(T) + ab[s_c(T - \Delta\tau) + s_c(T + \Delta\tau)] \quad (8)$$

in which $s_c(T)$ is the source auto-correlation function, and corresponds to the Fourier anti-transform of 51 $S_{in}(v)|^2$.

The photo-current has three components: the source auto-correlation function and its replications translated about the two symmetric points ±Δτ. This well known result [1] is obtained with simple calculation within the proposed model.

Therefore, thanks to said characteristics the side lobes of the interferogram have the same shape as the central peak and are located in the two points ±Δτ, symmetrical with respect to the central peak.

The case of fibre with random birefringence is the more important one in practice and requires a more complicated mathematical treatment. The analysis is founded on the computation of the average value of the random process represented by the photo-current I(v).

This computation has dual importance. First of all, it leads to a simple and elegant formal result represented by equation (9). Secondly, from the point of view of application to PMD measurement, this mathematical operation corresponds to a computation of averages of different measured interferograms, as will be shown hereafter, allowing an experimental verification of the proposed model. From equation (7) one computes the statistical average >.< of the photo-current:

$$\langle I(v) \rangle = \left\langle \sum_{n=N}^{M} (a_n^2 + b_n^2) U_n^2 |S_e(v - n\Delta v)|^2 + \right.$$

$$\left. \sum_{n=N}^{M} a_n b_n U_n^2 |S_e(v - n\Delta v)|^2 (e^{-j2\pi v \Delta \tau_n} + e^{j2\pi v \Delta \tau_n}) \right\rangle.$$

Taking into account the linearity of the statistical mean and the fact that the random variables $\Delta\tau_n$ are independent from the random variables $a_n b_n$ and $(a_n^2 + b_n^2)$ (this is a direct consequence of the random nature of the birefringence of the fibre), one immediately obtains:

$$\langle I(v)\rangle = \sum_{n=N}^{M} \langle a_n^2 + b_n^2\rangle U_n^2 |S_e(v - n\Delta v)|^2 +$$

$$\sum_{n=N}^{M} \langle a_n b_n\rangle U_n^2 |S_e(v - n\Delta v)|^2 \langle e^{-j2\pi v \Delta \tau_n} + e^{j2\pi v \Delta \tau_n}\rangle.$$

Since the statistical average of the exponential of the random variables $\Delta\tau_n$ is their characteristic function $\Psi_{\Delta\tau_n}(v)$, the previous equation can be rewritten in the form:

$$\langle I(v)\rangle = \sum_{n=N}^{M} \langle a_n^2 + b_n^2\rangle U_n^2 |S_e(v - n\Delta v)|^2 +$$

$$\sum_{n=N}^{M} \langle a_n b_n\rangle U_n^2 |S_e(v - n\Delta v)|^2 (\Psi_{\Delta\tau_n}(-v) + \Psi_{\Delta\tau_n}(v))$$

Moreover, for a given fibre, the characteristic functions $\Psi_{\Delta\tau_n}(v)$ and the statistical averages $\langle a_n b_n\rangle$ and $\langle a_n^2 + b_n^2\rangle$ do not depend on frequency; i.e. they do not depend on the sum index n. Therefore, the previous equation is simplified as:

$$\langle I(v)\rangle = \langle a^2 + b^2\rangle \sum_{n=N}^{M} U_n^2 |S_e(v - n\Delta v)|^2 +$$

$$\langle ab\rangle(\Psi_{\Delta\tau}(-v) + \Psi_{\Delta\tau}(v)) \sum_{n=N}^{M} U_n^2 |S_e(v - n\Delta v)|^2.$$

A Fourier anti-transform provides the statistical average of photo-current in the time domain:

$$\langle I(T)\rangle = \langle a^2 + b^2\rangle s_C(T) + \langle ab\rangle s_C(T) * [f_{\Delta\tau}(-T) + f_{\Delta\tau}(T)], \quad (9)$$

in which $f_{\Delta\tau}(T)$ is the probability density of $\Delta\tau$, and the asterisk indicates the convolution.

In this case, too, the photo-current is given by three contributions. The first term of equation (9) is linked to the properties of coherence of the optical source, and it is represented by a peak located in the origin of the times axis. The second and third term correspond to two symmetrical lateral lobes and contain all the information required to measure the PMD. The expression of the average photo-current, in spite of the symmetry about a peak in T=0, is very different from a Gaussian, due to the presence of the side lobes constituted by the convolution of $s_c(T)$ with the probability density of the differential group delay $f_{\Delta\tau}(T)$. Since it is assumed that the coherence time of the source (i.e. the width of the central peak) is negligible relative to the average DGD of the fibre, the two side lobes represent approximate measurements of the probability density of the DGD of the fibre. The quality of this approximation depends, as stated, on the coherence time of the source used, and can be improved by means of an appropriate de-convolution of the interferometric diagram measured with the auto-correlation function of the source itself $s_C(T)$ (this function can be measured separately by directly connecting the optical source to the interferometer). Lastly, it can be stated that equation (9) is a generalisation of equation (8) if one only considers that the probability density of the DGD of a fibre with systematic birefringence is a Dirac function $\delta$.

Therefore, thanks to this characteristic the measurement of PMD with interferometric technique is conducted not with a Gaussian interpolation of the interferogram, but rather by analysing at least one of the side lobes of the interferogram, considered, according to the present invention, as an approximate measurement of the probability density of the DGD associated with the PMD of the optical fibre 11.

The propagation model according to the present invention was tested by means of simultaneous PMD measurements using both the interferometric method, described in the present embodiment, and the method, also known, of JME or Jones Matrix Eigenanalysis.

The tested fibre (50 km of coil wrapped single mode conventional fibre) was placed in a thermal chamber at temperatures varying from about 2° C. to about 60° C. at 5° C. steps. After each variation, the fibre was allowed to stabilise before conducting the interferometric and polarimetric measurements. Thereby, over several days, 15 interferograms and 15 DGD measurements with JME method (each constituted by 91 points) were acquired. The data were then processed with the following procedure:

the mean of the interferograms was computed after they were normalised;

said mean was compared with two symmetrical replications of the DGD probability density computed from the JME data.

Note that the first processing operation is suggested directly by the interpretation of the interferograms as probability density and corresponds to the computation of the mean photo-current as shown in equation (9).

Figure 4:
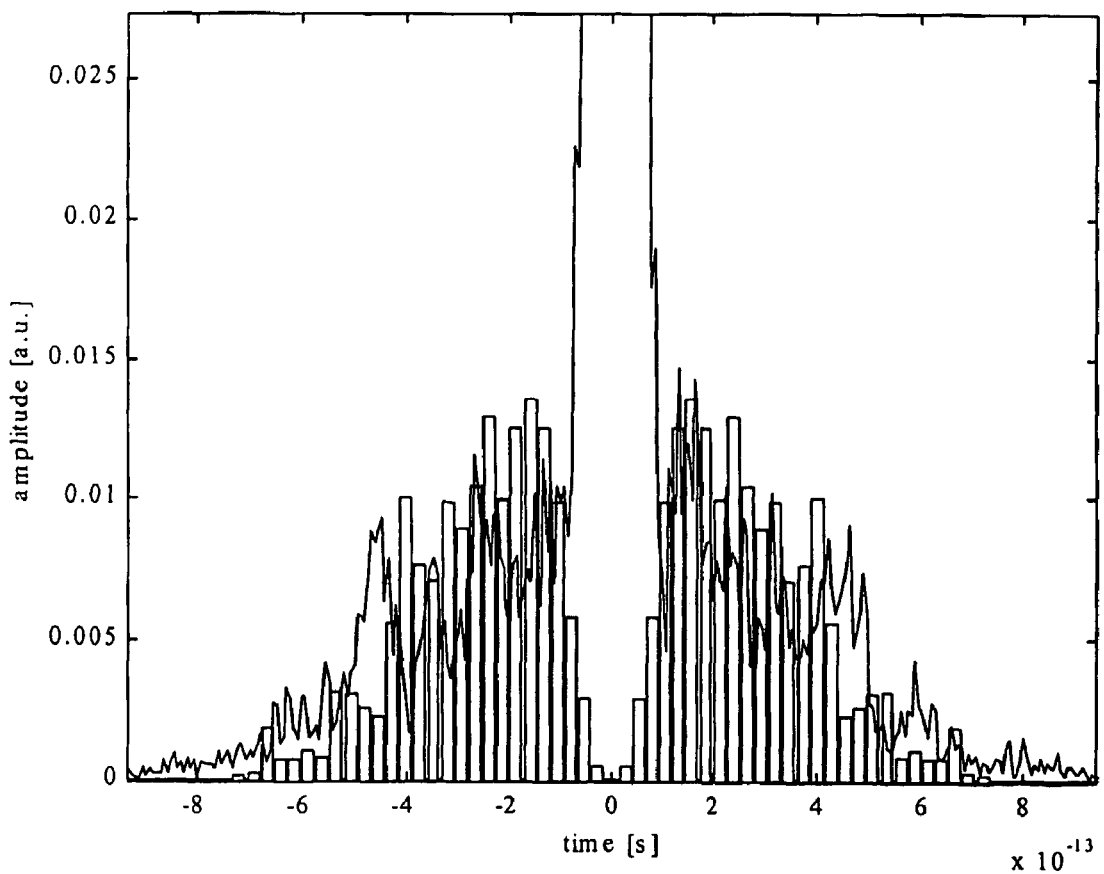
FIG. 4 shows an example of the results obtained with the method according to the invention.

From FIG. 4, which shows the results of the measurements, the good agreement between the results is readily apparent.

In particular, from the results of the measurements, it is readily apparent that the central peak of the interferogram must be neglected because it depends only on the characteristics of coherence of the source and not on the PMD of the fibre.

The result obtained, according to the present invention, attributes a new physical meaning to the interferometric curves, particularly useful for measurement activities.

Obvious modifications or variations are possible to the above description, in the dimensions, shapes, materials, components, circuit elements, connections and contacts, as in the details of the circuitry and of the illustrated construction and of the method to be implemented, without thereby departing from the spirit of the invention as specified by the claims that follow.

The invention claimed is:

1. A method for measuring the polarization mode dispersion of an optical fiber, the method comprising the steps of:
    applying an optical signal to a first end of the fiber,
    coupling a second end of the fiber to an interferometer;
    generating by means of said interferometer at least one interferogram comprising at least a central peak and two side lobes having a determined information content;
    processing said interferogram in such a way as to measure the information content of at least one of said two side lobes;
    determining the polarization mode dispersion of the fiber and associating with the measurement of said information content a probability density function representative of the polarization mode dispersion of the fiber in the form of differential group delay by computing the deconvolution of the one side lobe with the central peak so that the deconvolution corresponds to the probability density of the differential group delay determined by the PMD of the fiber; and outputting the determined polarization mode dispersion.

2. The method as claimed in claim 1, further comprising the step of determining an average of measurements of said information content to which said probability density is to be associated.

3. The method as claimed claim 1, wherein said information content comprises a single numeric value determined by the position of said at least one side lobe in the interferogram.

4. The method as claimed in claim 1 wherein said information content comprises a plurality of values determined by the position of said at least one side lobe in the interferogram.

5. A computer program product able to be directly loaded in the internal memory of an electronic measuring device and comprising portions of software code to implement the method as claimed in claim 1 when the product is run on said electronic device.

6. The method as claimed in claim 1 wherein the determined polarization mode is outputted by displaying it.

7. A system for measuring the polarization mode dispersion of an optical fiber, the system comprising:

an optical source able to generate an optical signal to be injected into the fiber;

an interferometer associated with the fiber and able to generate an interferogram comprising at least a central peak and two side lobes having a determined information content;

control means connected to said interferometer for processing said interferogram in such a way as to measure the information content of at least one of said side lobes;

determining the polarization mode dispersion of the fiber and associating with the measurement of said information content a probability density function representative of the polarization mode dispersion of the fiber in the form of differential group delay; and computing the deconvolution of the one side lobe with the central peak so that the deconvolution corresponds to the probability density of the differential group delay determined by the PMD of the fiber.

8. The system as claimed in claim 7, wherein the control means further serves for determining an average of measurements of said information content to which said probability density is to be associated.

9. A device for measuring the polarization mode dispersion of an optical fiber into which optical signals have been injected, the device comprising an optoelectronic module able to convert the optical signals into electrical signals;

means for generating an interferogram comprising at least a central peak and two side lobes a having a determined information content;

control means for measuring the information content of at least one of said two side lobes;

determining the polarization mode dispersion of the fiber and associating with the measurement of said information content a probability density function representative of the polarization mode dispersion of the fiber in the form of differential group delay; and computing the deconvolution of the one side lobe with the central veak so that the deconvolution corresponds to the probability density of the differential group delay determined by the PND of the fiber.

10. The device as claimed in claim 9, wherein the control means further serves for determining an average of measurements of said information content to which said probability density is to be associated.

* * * * *